(12) United States Patent
Wambsganss et al.

(10) Patent No.: US 10,476,370 B2
(45) Date of Patent: Nov. 12, 2019

(54) SPLIT RAIL PFC AND AC INVERTED ARCHITECTURE

(71) Applicant: Astronics Advanced Electronic Systems Corp., Kirkland, WA (US)

(72) Inventors: Warren Wambsganss, Snoqualmie, WA (US); Jeffrey A. Jouper, Newcastle, WA (US)

(73) Assignee: ASTRONICS ADVANCED ELECTRONICS SYSTEMS CORP., Kirkland, WA (US)

( * ) Notice: Subject to any disclaimer, the term of this patent is extended or adjusted under 35 U.S.C. 154(b) by 0 days.

(21) Appl. No.: 14/471,998

(22) Filed: Aug. 28, 2014

(65) Prior Publication Data

US 2016/0065048 A1    Mar. 3, 2016

(51) Int. Cl.
| | |
|---|---|
| *H02M 1/42* | (2007.01) |
| *H02M 1/12* | (2006.01) |
| *H02M 3/335* | (2006.01) |
| *H02M 1/00* | (2006.01) |

(52) U.S. Cl.
CPC ............ *H02M 1/12* (2013.01); *H02M 1/425* (2013.01); *H02M 1/4208* (2013.01); *H02M 1/4225* (2013.01); *H02M 3/33546* (2013.01); *H02M 2001/007* (2013.01); *Y02B 70/126* (2013.01)

(58) Field of Classification Search
CPC .......... H02M 5/04; H02M 5/458; H02M 1/12; H02M 1/4225; H02M 1/425; H02M 1/4208; H02M 2001/007; H02J 4/00; H02J 2003/365; H02J 3/02; H02J 3/34; Y02B 70/126

USPC ................................. 307/9.1; 363/34, 37
See application file for complete search history.

(56) References Cited

U.S. PATENT DOCUMENTS

| | | | |
|---|---|---|---|
| 5,057,990 A * | 10/1991 | Gulczynski | H02M 3/1582 323/350 |
| 5,111,373 A * | 5/1992 | Higaki | H02M 5/458 363/124 |
| 5,291,119 A | 3/1994 | Cowett, Jr. | |
| 6,266,260 B1 | 7/2001 | Zahrte, Sr. et al. | |
| 7,391,132 B2 * | 6/2008 | Chen | H02J 9/062 307/43 |
| 7,906,866 B2 | 3/2011 | Anghel et al. | |
| 2002/0079706 A1 * | 6/2002 | Rebsdorf | H02M 1/42 290/55 |
| 2010/0202168 A1 | 8/2010 | Kanno | |
| 2013/0026835 A1 | 1/2013 | Ghosh et al. | |

(Continued)

OTHER PUBLICATIONS

Stout ("Optimizing Aircraft Power", M. Stout, Falcon Electric, http://www.falconups.com/Optimizing_Aircraft_Power.pdf).*

(Continued)

*Primary Examiner* — Gary L Laxton
*Assistant Examiner* — Jye-June Lee
(74) *Attorney, Agent, or Firm* — Wiggin and Dana LLP; Gregory S. Rosenblatt; Jonathan D. Hall

(57) ABSTRACT

A power conversion system including power factor correction circuitry and power inversion circuitry. The power factor correction circuitry has a split-rail configuration and includes a bidirectional switch used to produce intermediate direct current power. The power inversion circuitry selectively operates switches to produce sinusoidal alternating current output power. The output power and the intermediate power are regulated together.

4 Claims, 13 Drawing Sheets

(56) References Cited

U.S. PATENT DOCUMENTS

2015/0016155 A1* 1/2015 Lee .................... H02M 5/4585
363/44
2016/0006295 A1 1/2016 Yang et al.

OTHER PUBLICATIONS

J. C. Salmon, "Circuit topologies for PWM boost rectifiers operated from 1-phase and 3-phase AC supplies and using either single or split DC rail voltage outputs," Applied Power Electronics Conference and Exposition, 1995. APEC '95. Conference Proceedings 1995., Tenth Annual, Dallas, TX, 1995, pp. 473-479 vol. 1.*
"Optimizing Aircraft Power", M. Stout, Falcon Electric, http://www.falconups.com/Optimizing_Aircraft_Power.pdf.*
Qiao, C. & Smedley, K., Three-Phase Unity-Power-Factor Star-Connected Switch (VIENNA) Rectifier With Unified Constant-Frequency Integration Control, IEEE Transactions on Power Electronics, Jul. 2003, vol. 18, No. 4.
Qi, T. & Sun, J., Dual-Boost PFC Converter Control Without Input Current Sensing, IEEE, 2009.
Park, Je-Wook et al., DC Voltage Balancing Control of Half-Bridge PWM Inverter for Linear Compressor, 3rd IEEE International Symposium on Power Electronics for Distributed Generation Systems (PEDG), 2012, pp. 598-602.
Xianjin, Zhang & Caihong, Fan, Research on 3-Phase 4-Wire VIENNA Rectifier Based on One Cycle Control, 2012 Fifth International Conference on Intelligent Computation Technology and Automation, pp. 281-281, Huaihai Institute Institute of Technology, Lianyungang, Jiangsu, China.
EP 15179498.9, Extended European Search Report, dated Jan. 15, 2016.

* cited by examiner

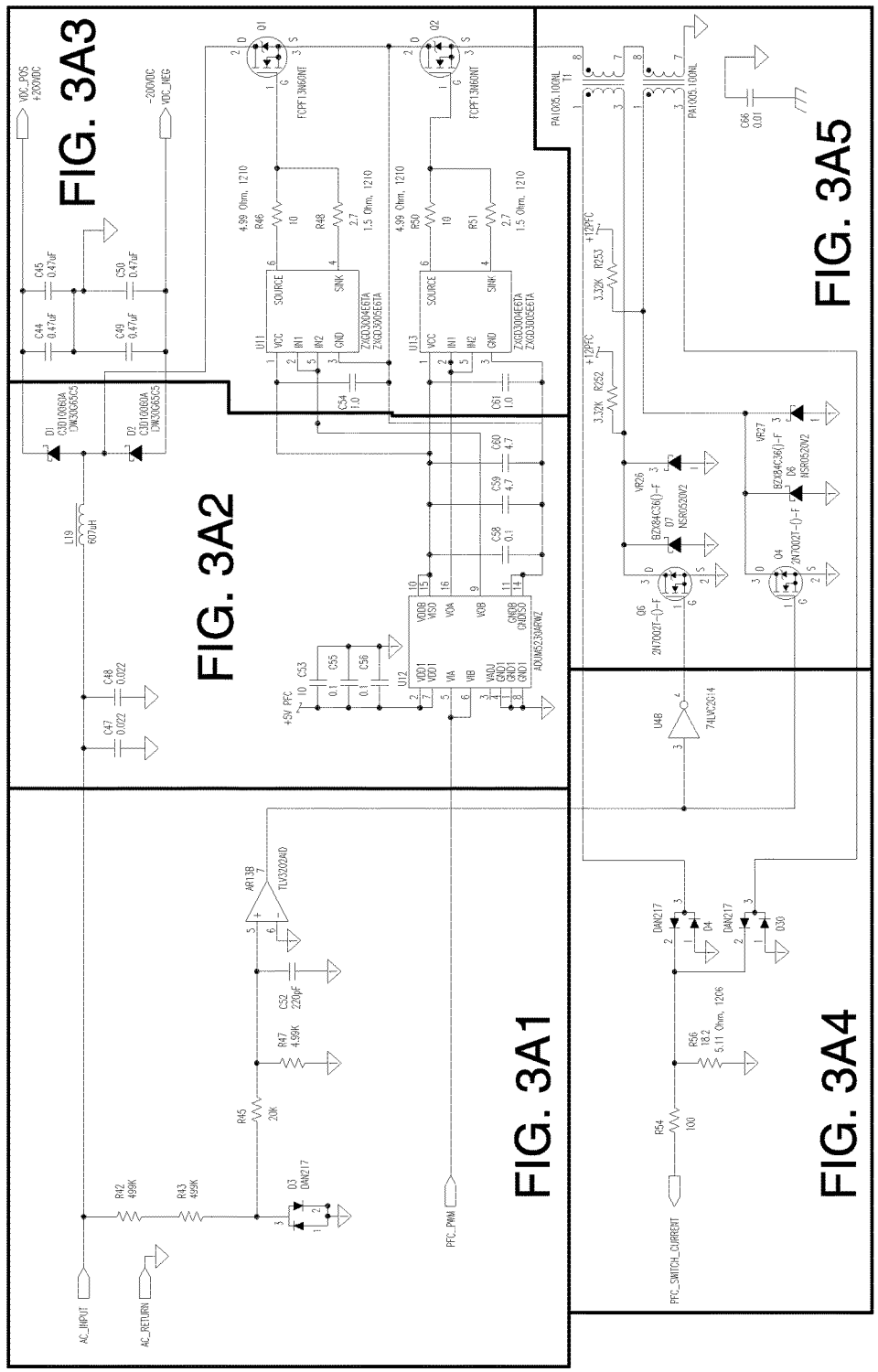

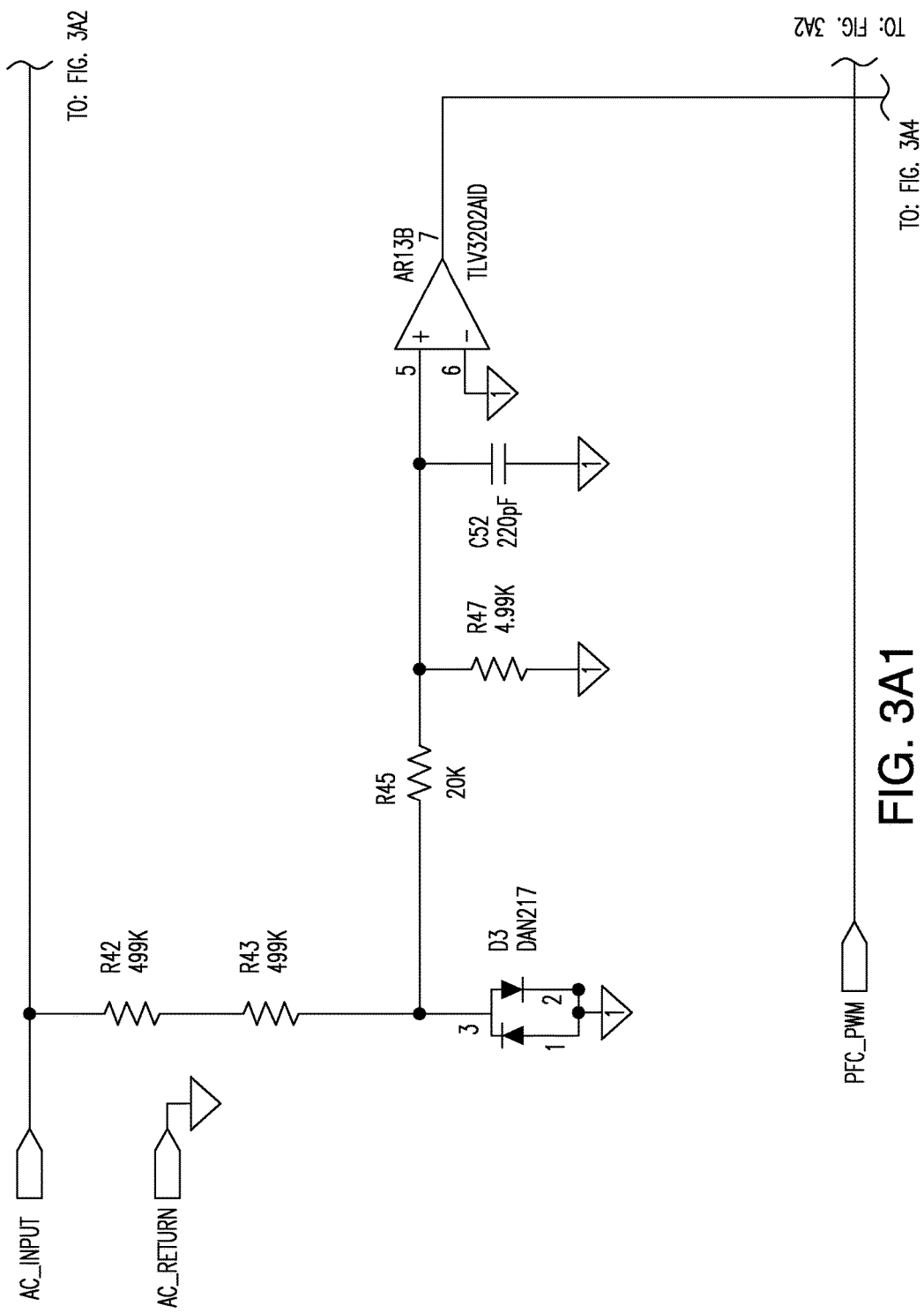
FIG. 3A1

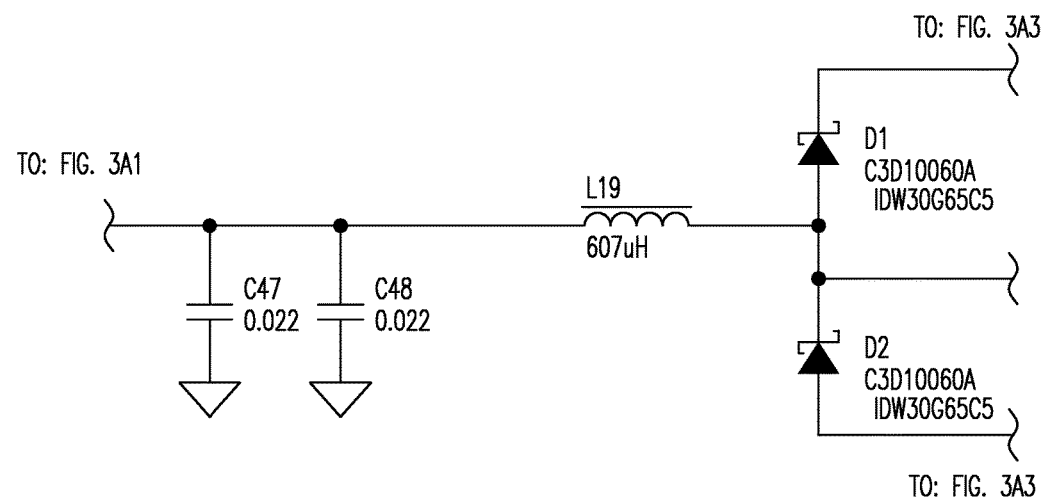
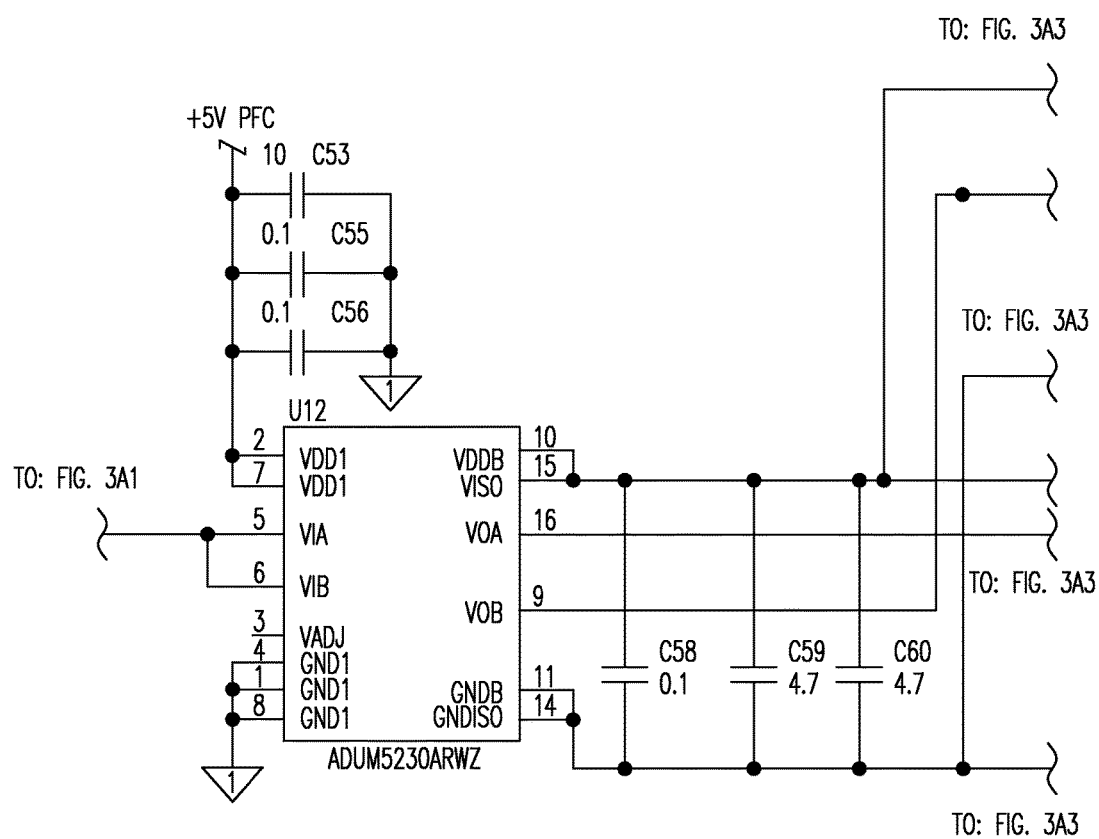
FIG. 3A2

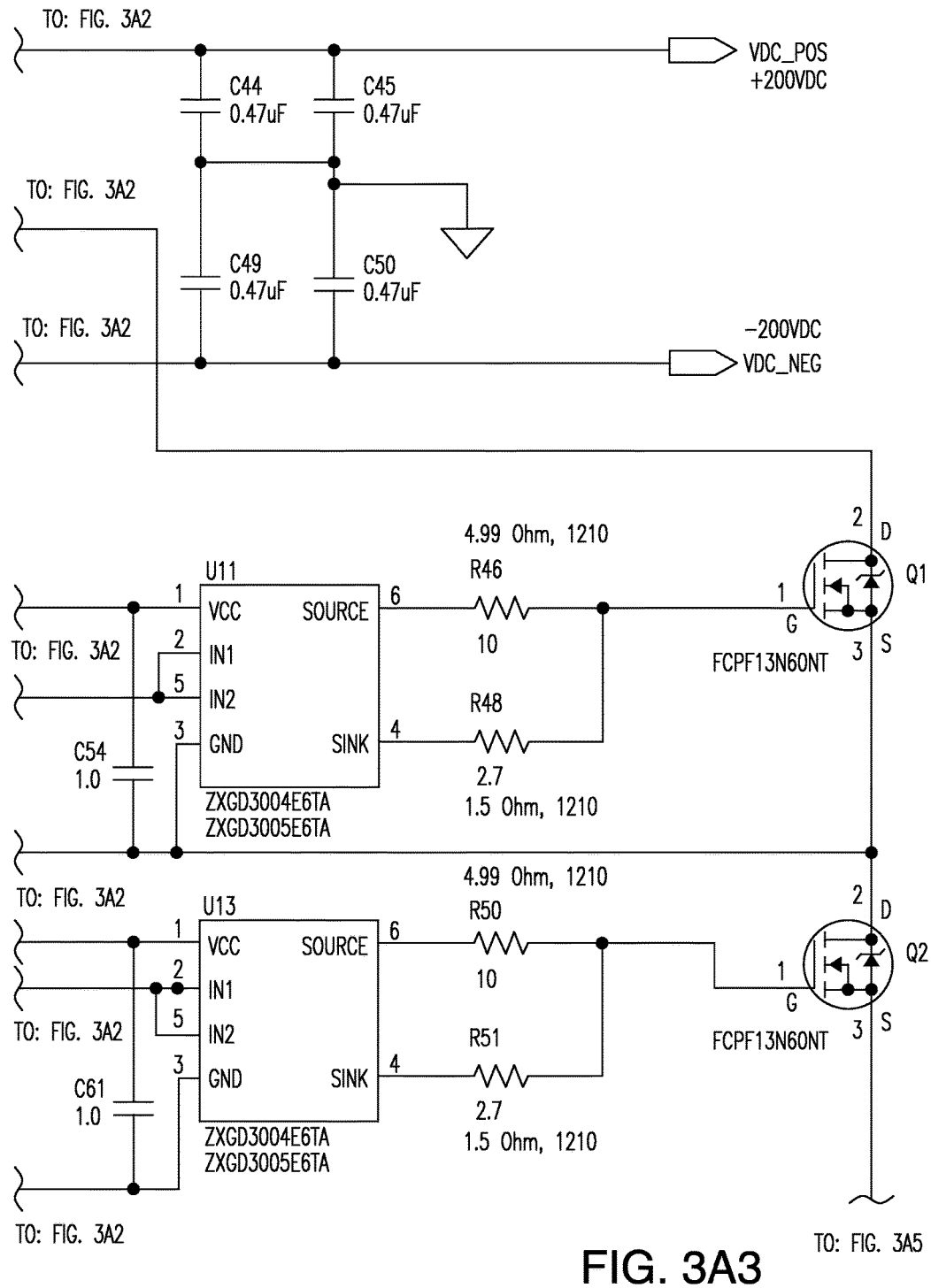
FIG. 3A3

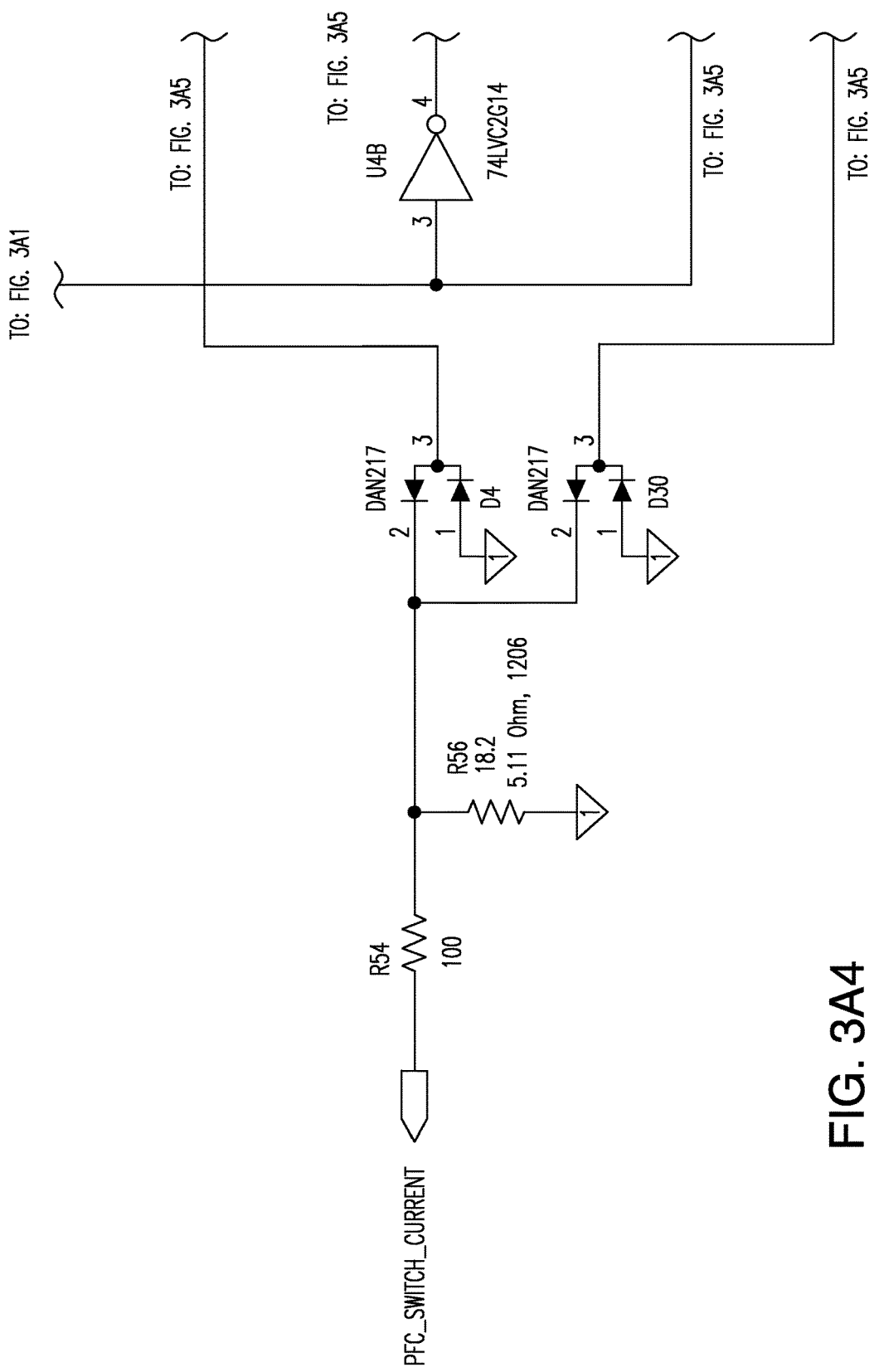
FIG. 3A4

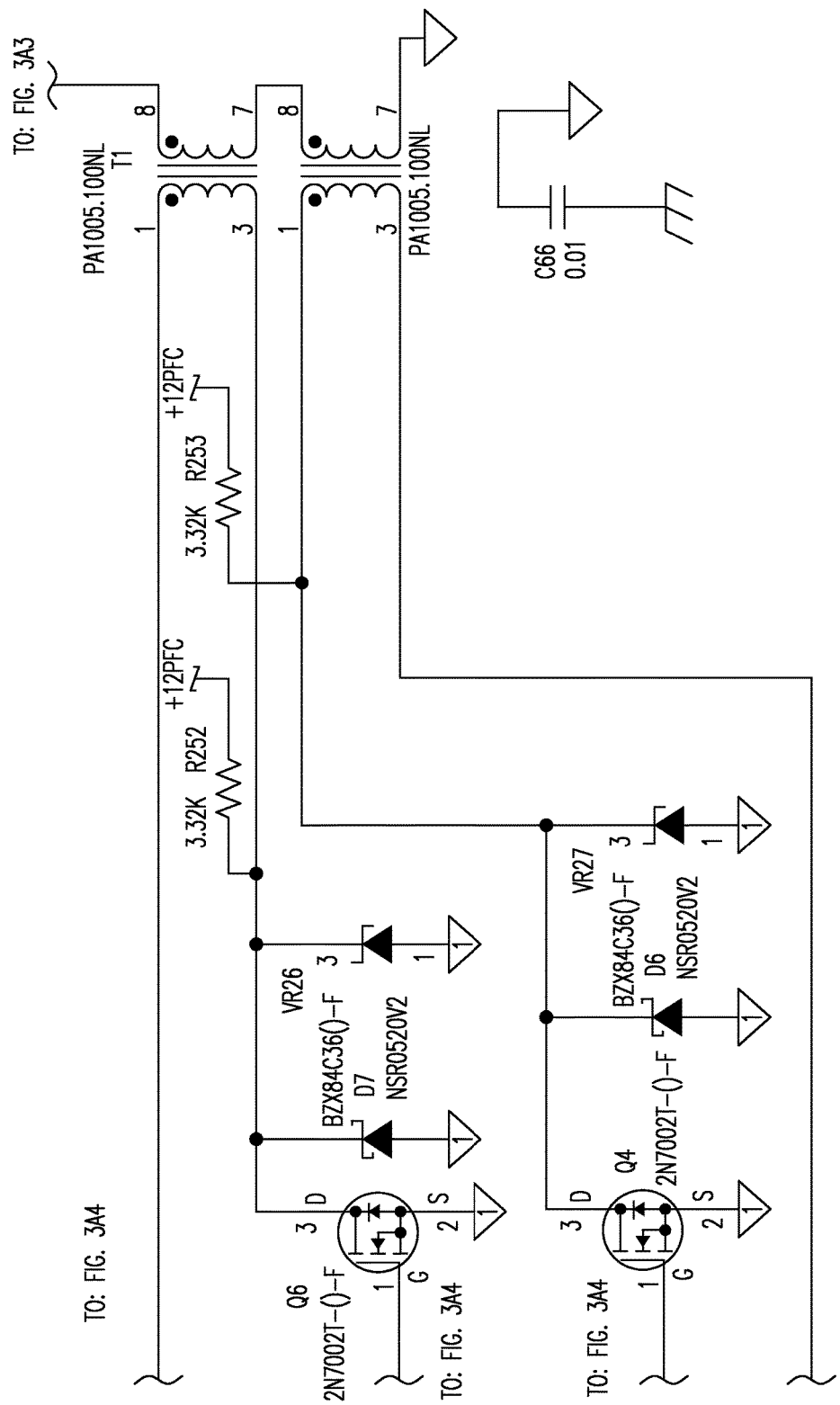
FIG. 3A5

SPLIT RAIL PFC AND AC INVERTED ARCHITECTURE

FIELD OF THE DISCLOSURE

The subject matter of the present disclosure generally relates to power conversion, and more particularly relates to power factor correction and inversion.

BACKGROUND OF THE DISCLOSURE

It is necessary in many environments to supply well-regulated power suitable for user electronic devices. For instance, many commercial aircraft provide passengers with 50/60 Hz 115 Volts Alternating Current (VAC) power via seat-back power outlets. Such power is generally, with some shortcomings, compatible with many consumer electronic devices, such as certain laptop computers, cellular telephones, tablet computers, etc.

In many instances the creation of well-regulated power involves modifying, or converting, otherwise unsuitable power. For instance, in some aircraft, generator systems are configured to produce 360-800 Hz 115 VAC power that is not readily compatible with commercial electronic devices, and therefore must be converted prior to use by passengers.

Power conversion can involve regulating or manipulating various characteristics of power. Often, frequency conversion is necessary. In many environments, other factors are also important, such as power quality and the efficiency, size and weight of conversion equipment.

In commercial aircraft, power quality requirements often necessitates a power factor correction (PFC) stage for conversion of the aircraft power to an intermediate DC voltage. This intermediate DC voltage can then be utilized to create regulated, low distortion 50/60 Hz 115 VAC sine wave power for passenger equipment. Because of the need for very high power conversion efficiency, small size, and low weight, it is advantageous to utilize a non-isolated power conversion architecture. However, such architecture preferably eliminate influences from the input power, such as common mode fluctuations at 360-800 Hz and also harmonics, in order to provide compatibility with certain user equipment, particularly user devices that utilize electrically sensitive interfaces such as capacitive touch screens.

The subject matter of the present disclosure is directed to overcoming, or at least reducing the effects of, one or more of the problems set forth above.

BRIEF SUMMARY OF THE DISCLOSURE

Disclosed is a power conversion system and method, suitable for, among other things, the effective conversion of power produced by an aircraft's generator system into power suitable for use with consumer electronic devices.

An embodiment has a power factor correction (PFC) stage and a power inversion (PI) stage. The PFC stage utilizes a split-rail output boost converter, composed of a bi-directional switch, two diodes, and an inductor. A positive and a negative voltage are produced by the PFC stage and filtered by capacitors. The PI phase is an alternating current (AC) sine-wave inverter, including two switches, an inductor, and an output filter capacitor. The PI stage produces output power according to conversion requirements. Common mode fluctuations and harmonics are prevented by centering the voltages produced by the PFC converter and the output of the PI stage around a common AC return line.

The disclosed system presents several advantages. For instance, the non-isolated nature of the architecture allows certain embodiments to be highly efficient. The input current waveform and the output voltage waveform of certain embodiments are highly controllable. Also, embodiments may have low levels of leakage current.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which:

FIG. 3A is a breakdown overview of a schematic diagram of a demonstrated embodiment architecture. FIGS. 3A1-3A5 are detailed views of portions of the schematic diagram overview shown in FIG. 3A.

Like reference numbers and designations in the various drawings indicate like elements.

DETAILED DESCRIPTION

Disclosed is a power conversion system and method suitable for converting power to be usable by commercial electronic devices. A PFC stage modifies power received from a power source and a PI stage creates the desired AC output current.

Figure 1:
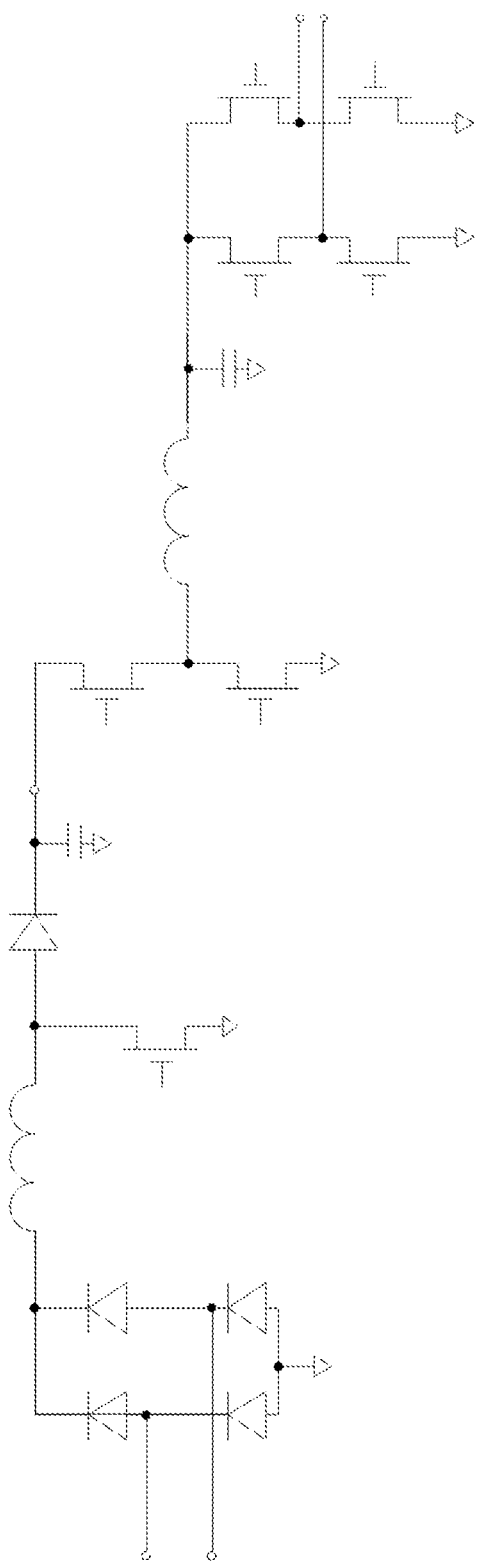
FIG. 1 is a schematic diagram of prior art power conversion architecture.

FIG. 1 is a schematic diagram of a prior art power conversion system. In certain instances, this architecture is functional and satisfies some common power quality and functional requirements. However, the efficiency can be moderate, often in the range of 85% to 90%, due to diode rectifier in the PFC stage and the number of switches in the AC inverter needed to provide a polarity reversal. This architecture also has the disadvantage of passing common mode voltage fluctuations from the AC input to the AC output. This has been shown to cause the malfunction of certain hand-held devices that utilize capacitive touch-screens. Certain other power conversion topologies are available, such as cycloconverters, but these solutions still fail to meet the input and output power quality requirements of certain passenger aircraft.

Figure 2:
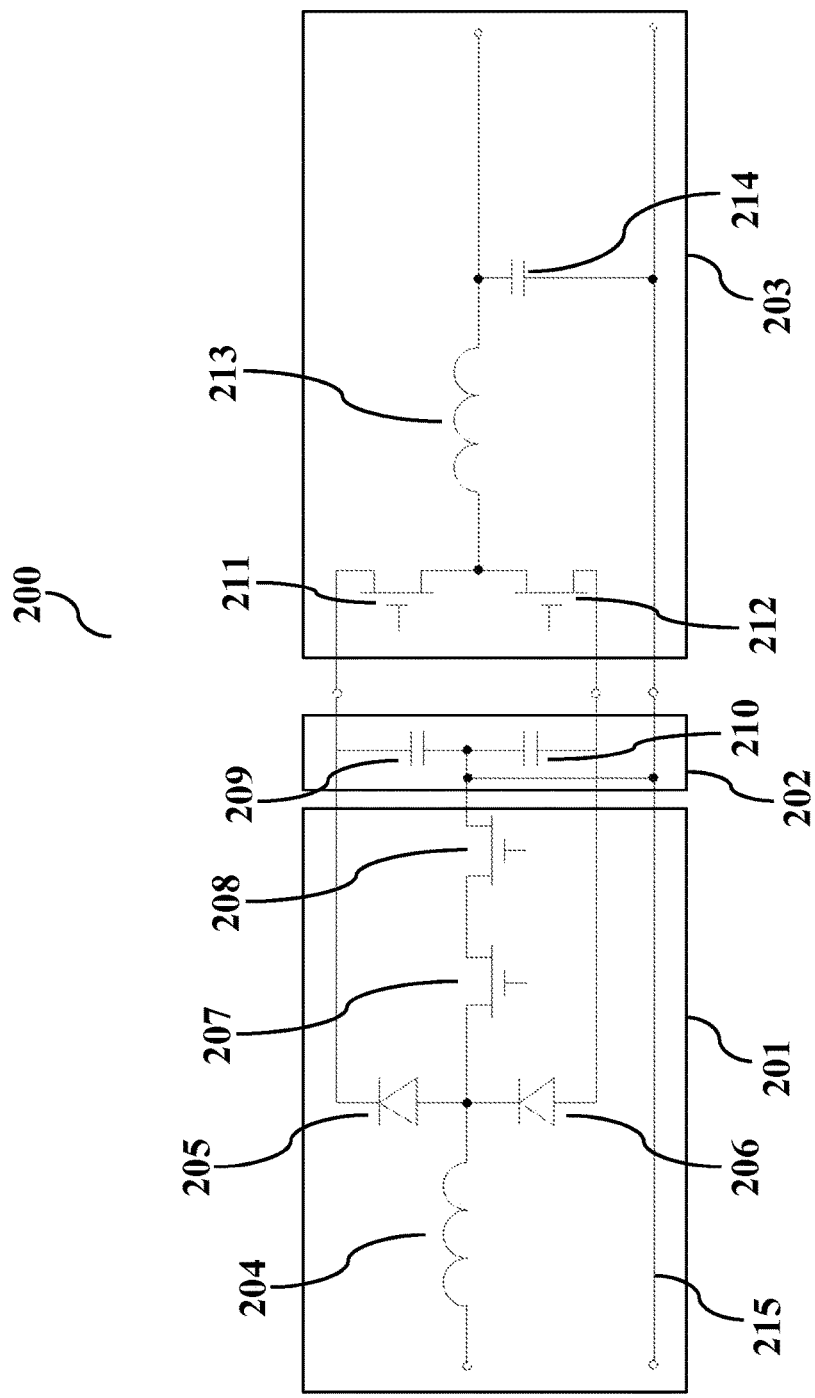
FIG. 2 is a schematic diagram of an embodiment architecture.

FIG. 2 is a schematic diagram of an embodiment of a power conversion system 200. In the diagram, power conversion system 200 can be said to have three phases, including split-rail PFC phase 201, filter phase 202, and PI phase 203. The term 'phase' should be understood as a means to aptly describe various aspects of an embodiment in a non-limiting manner. In practice, the PFC phase, filter phase and PI phase may be integrated together into a single unit without discernable boundaries.

PFC phase 201 includes inductor 204, first diode 205, second diode 206, first Metal-Oxide-Semiconductor Field-Effect Transistor (MOSFET) 207 and second MOSFET 208. Together MOSFETs 207 and 208 act as a bidirectional switch. In the embodiment, filter stage 202 includes first capacitor 209 and second capacitor 210. PI phase 203 includes a first switch 211, a second switch 212, inductor 213, and filter capacitor 214.

In operation, power is supplied from a power source (not pictured), and received by the PFC stage 201. The bidirectional switch is operated so as to create intermediate DC power by boosting the input AC current to both a positive and negative DC output voltage. When the bidirectional switch is closed, the input voltage is applied across the inductor, storing energy in the inductor. When the bidirectional switch is opened, the energy stored in the inductor is transferred through one of the two diodes, depending on the polarity of the input voltage, to the capacitors of filter state 202. The on-time or duty cycle of the bidirectional switch is controlled in such a way as to both regulate the output voltage of the PFC stage at a constant average DC voltage and to draw current from the power source which is proportional to the input voltage, typically having a sinusoidal waveform. In a particular embodiment the power source is the generator of an aircraft that is supplying 360-800 Hz 115 VAC power. The intermediate DC power is filtered by the capacitors in filter stage 202. Power inversion phase 203 utilizes the positive and negative DC voltage of the intermediate power to create 50/60 Hz 115 VAC sinusoidal output power by varying the duty cycles of switches 211 and 212 to create sinusoidal voltage. Common AC return line 215 eliminates common mode fluctuations in the output power of power conversion system 200 as both the intermediate DC power and output power are centered around it.

The subject matter of the present disclosure presents several advantages over previous systems. The disclosed architecture is non-isolated, and therefore embodiments of the disclosed subject matter may be highly efficient. Each of the components of certain embodiment PFC stages have only half of the power in the stage applied across them, which allows the use of lower voltage-rated devices and also reduces switch loss in the components.

The PFC stage may be controlled so that distortion in current consumption is minimal. In certain embodiments, the PFC is controlled so as to draw current directly proportional to the applied voltage, thereby allowing compliance with harmonic requirements proposed by certain airline industry specifications. In certain embodiments, the output voltage of the power inverter may be controlled so as to be characterized as low distortion sine waves.

The common mode voltage of the AC inverter and all internally connected voltages do not have significant common mode voltage fluctuation at the input power frequency. Because of this, many of the internal Y-connected capacitors do not conduct significant current at the input power frequency. This means very low levels of leakage current may be obtained with larger values of Y-connected capacitors.

EXAMPLES

FIG. 3A is an overview of the schematic diagram shown in FIGS. 3A1-3A5 which together depict the PFC circuitry of an embodiment that was built and tested. A split-rail DC output PFC circuit was 400-watt rated and received power from a 115 VAC source with a frequency range of 360-800 Hz. AC power was provided to the PFC circuit at AC_INPUT and AC_RETURN. The PFC control electronics generated a Pulse Width Modulation (PWM) signal at PFC_PWM, which was calculated to draw input current proportional to input voltage and also to regulate the output DC-link voltage, which was approximately +/−200 VDC at VDC_POS and VDC_NEG. VDC_POS and VDC_NEG were the split-rail voltages created by the PFC circuit. A signal PFC_SWITCH_CURRENT represents the current that was passed through the PFC bidirectional switch. This signal was utilized by the PFC control electronics and for protection of the PFC power stage in case of an overload or short circuit. Approximately 150 Watts of the power generated by the PFC circuit was utilized by a DC/DC converter for generation of power-line isolated 28 VDC. Approximately 250 Watts of power was utilized by a 60 Hz, 115 VAC inverter.

Figure 4A:
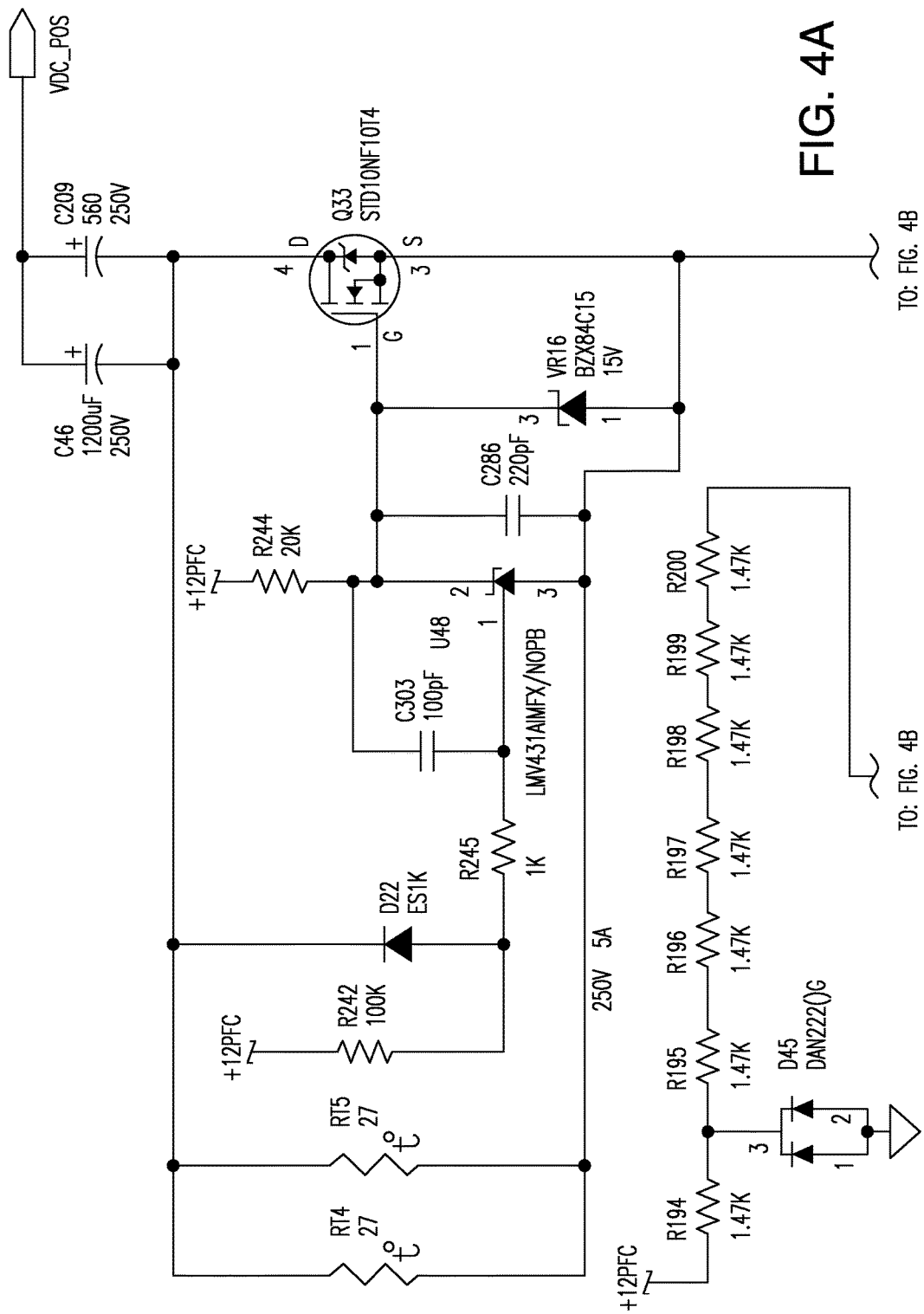
FIGS. 4A-4B together depict a schematic diagram of the DC-link filter capacitors utilized for the PFC stage of a demonstrated embodiment.
Figure 4B:
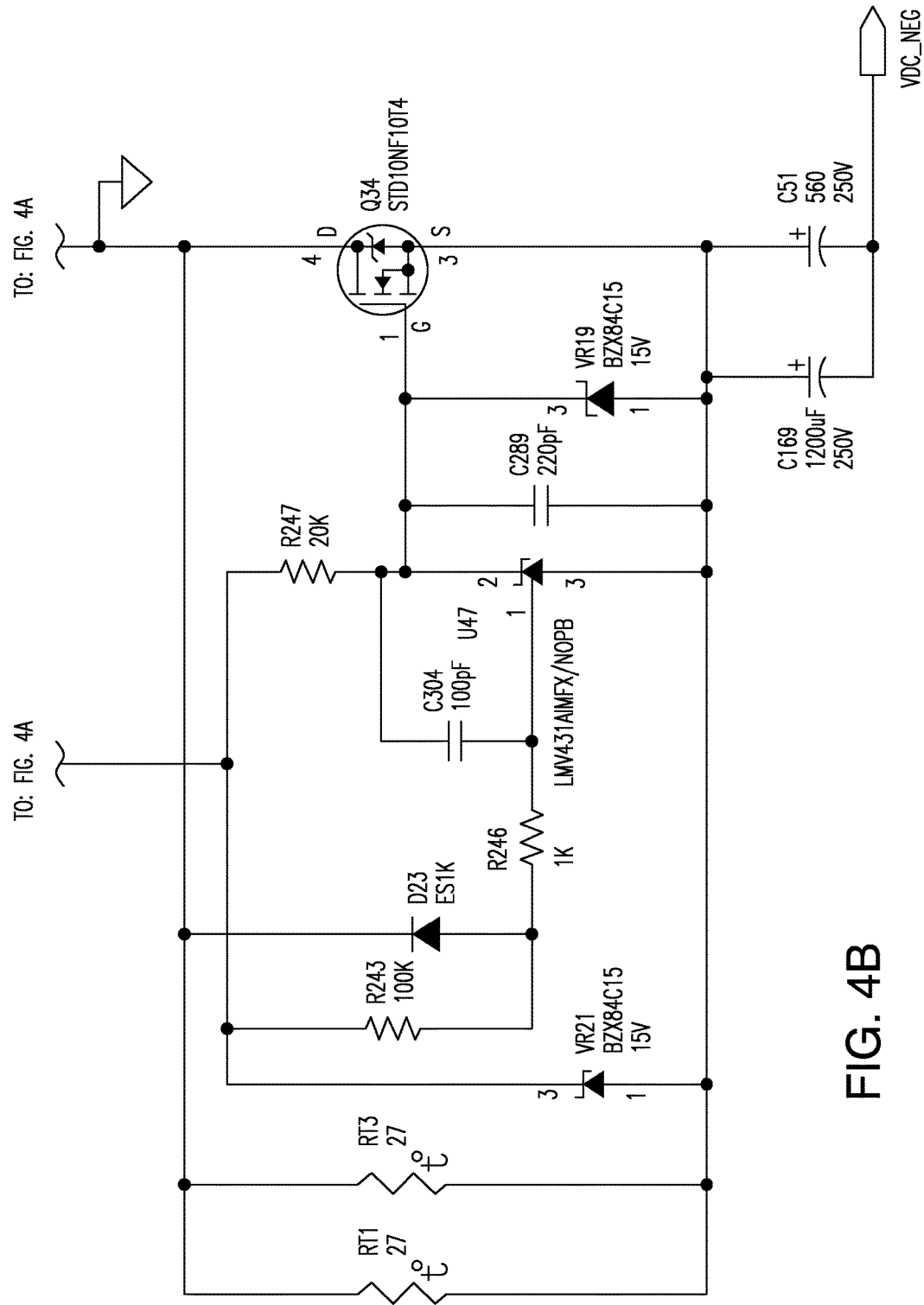

FIGS. 4A-B together depict a schematic diagram of DC-link filter capacitors that were utilized for filtering PFC circuitry output. This circuitry also included inrush current-limiting circuitry. VDC_POS and VDC_NEG signals were the split-rail voltages provided by the PFC circuitry.

Figure 5A:
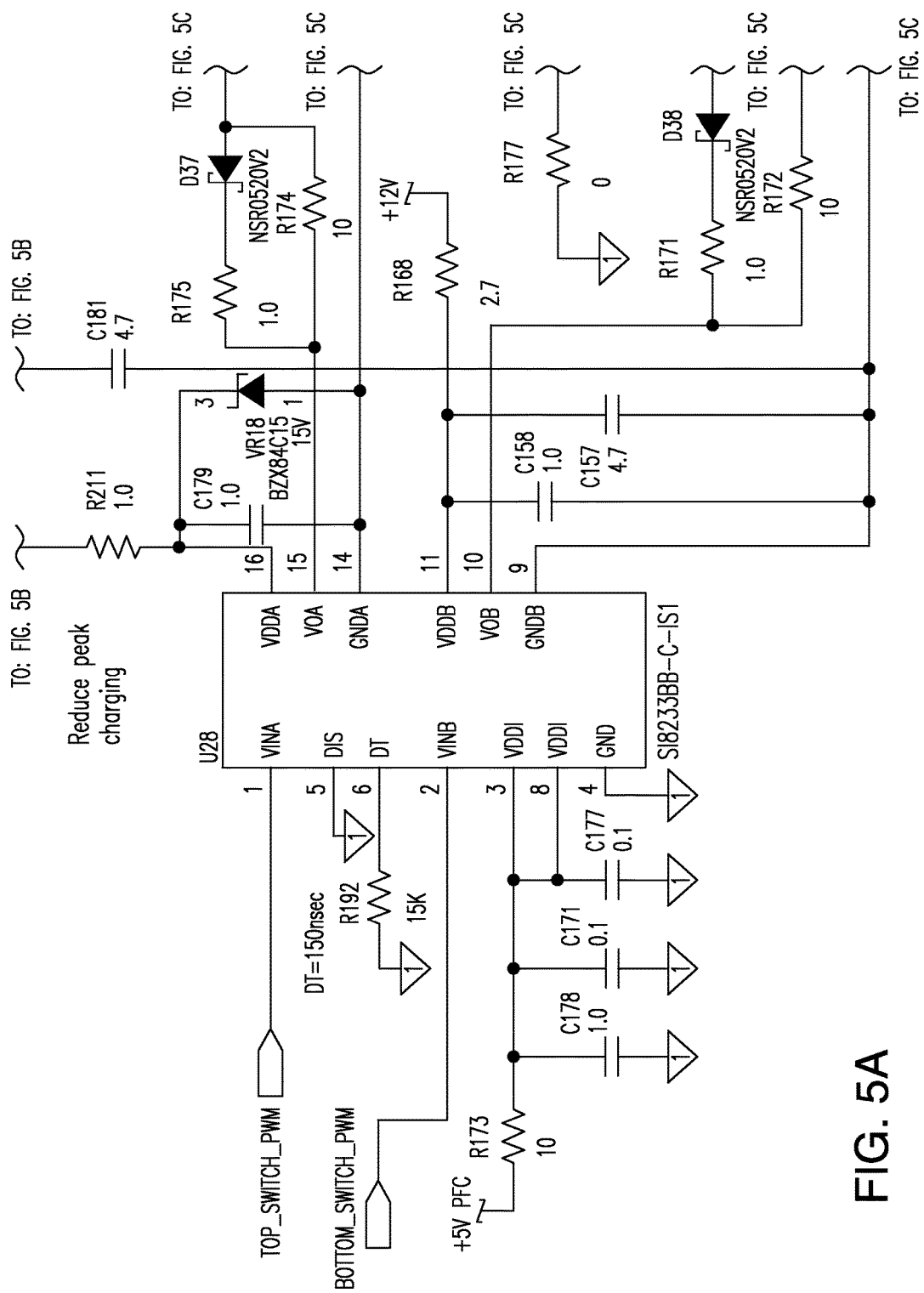
FIGS. 5A-C together depict a schematic diagram of the PI stage of a demonstrated embodiment.
Figure 5B:
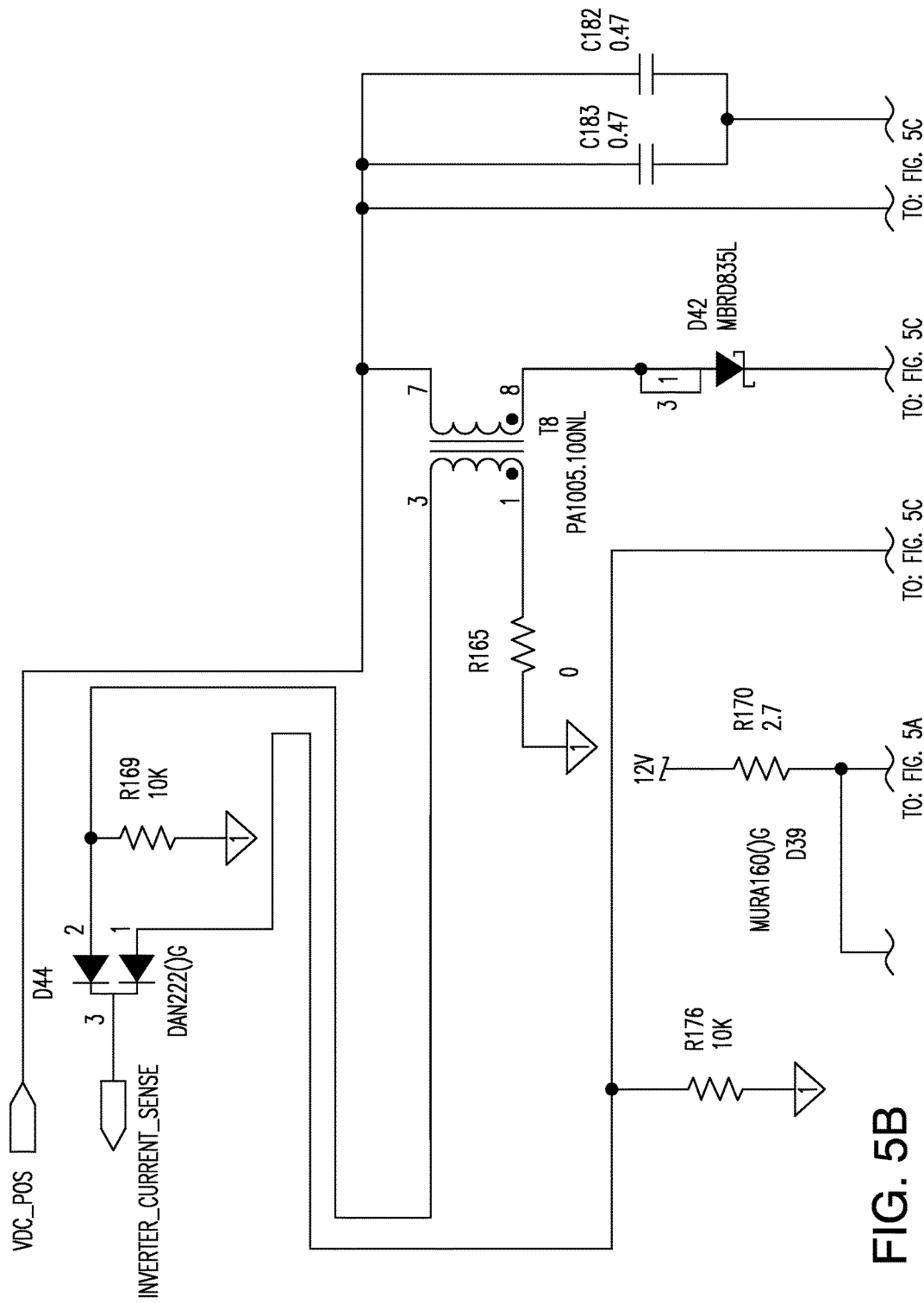
Figure 5C:
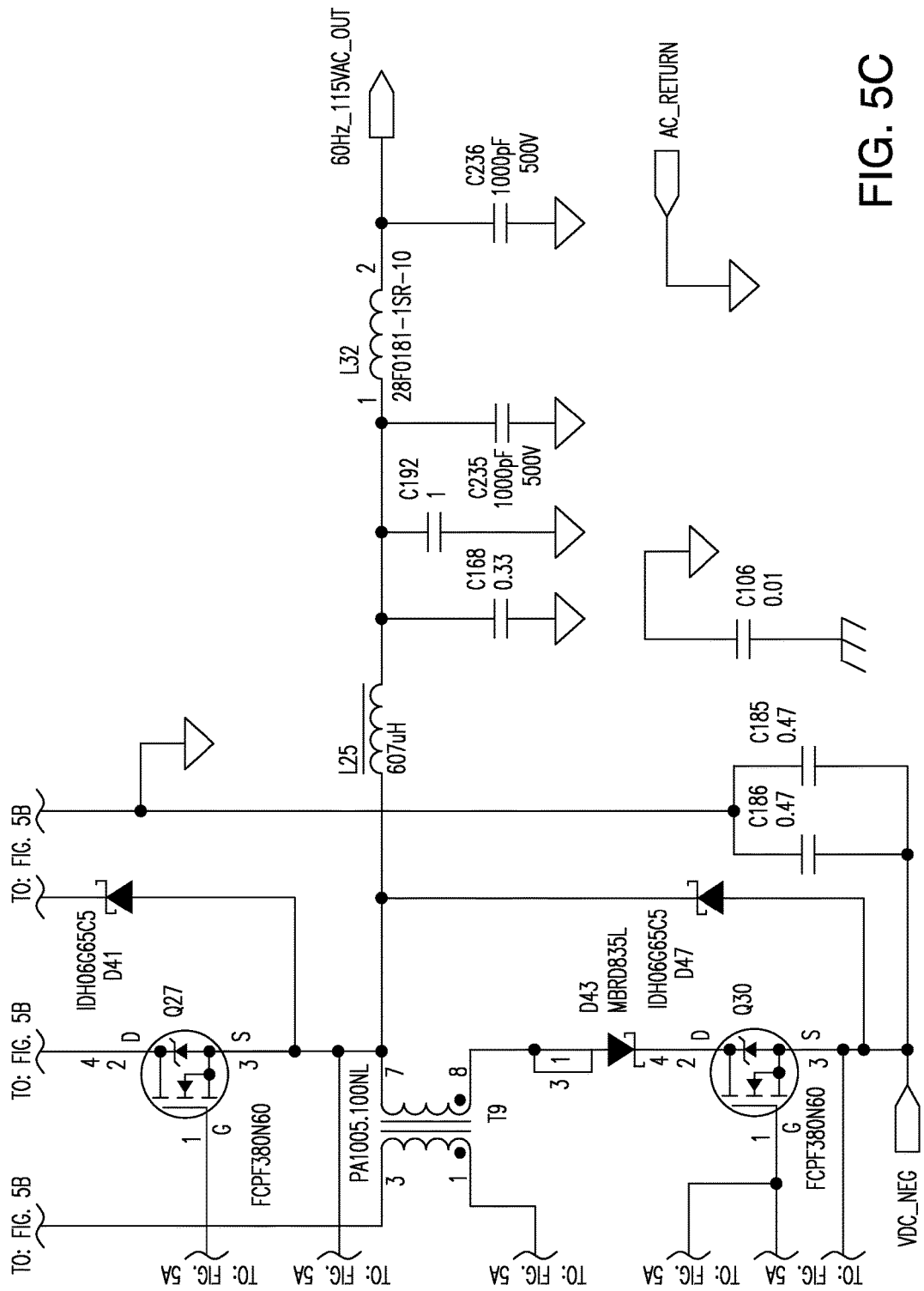

FIGS. 5A-C together depict a schematic diagram of a constructed 250 W, 60 Hz, 115 VAC AC inverter. Two signals, designated TOP_SWITCH_PWM and BOTTOM_SWITCH_PWM, were used to control the power stage switches to generate a sinusoidal output voltage waveform. Another signal, designated INVERTER_CURRENT_SENSE, was used to provide protection for the power stage in case of an overload or short circuit condition. VDC_POS and VDC_NEG signals were the split-rail voltages provided by a PFC stage. A 60 Hz 115 VAC sinusoidal output voltage was provided between 60 Hz_115 VAC_OUT and AC_RETURN. The AC Inverter functioned as a two-switch inverter, however multiple other components, such as diodes, were added for improved efficiency and EMI performance. These were not a deviation from the disclosed architecture, but design refinements.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed:

1. A power conversion system, comprising: an AC power source;
a power factor correction (PFC) stage including:
a first inductor directly connected to the power source via a first electrical path and directly connected to a first node via a second electrical path,
a first diode directly connected the first node via a third electrical path and directly connected to a second node via a fourth electrical path,
a second diode directly connected to the first node via a fifth electrical path and directly connected to a third node via a six electrical path,
a bidirectional switch directly connected to the first node via a seventh electrical path and directly connected to a fourth node via an eighth electrical path, a filter stage including:
a first capacitor directly connected to the second node via a ninth electrical path and directly connected to a fifth node via a tenth electrical path,
a second capacitor directly connected to the third node via an eleventh electrical path and directly connected to the fifth node via a twelfth electrical path,
the fourth node directly connected to the fifth node via a thirteenth electrical path and directly connected to a common AC return line via a fourteenth electrical path,
a power inversion phase including:

a first switch directly connected to the second node via a fifteenth electrical path and directly connected to a sixth node via a sixteenth electrical path, a second switch directly connected to the third node via a seventeenth electrical path and directly connected to the sixth node via an eighteenth electrical path, the sixth node directly connected to a second inductor via a nineteenth electrical path, the second inductor directly connected to a seventh node via a twentieth electrical path, a third capacitor directly connected to the seventh node via a twenty first electrical path and directly connected to the common AC return line via a twenty second electrical path;

wherein the forth electrical path and fifteenth electrical path together constitute a positive distribution rail and the sixth electrical path and seventeenth electrical path constitute a negative distribution rail;

wherein the power factor correction stage is configured to receive input AC power from the AC power source and produce intermediate DC power by alternately producing a positive intermediate DC output voltage along the positive distribution rail and a negative intermediate DC output voltage along the negative distribution rail through operation of the bidirectional switch;

wherein the power inversion phase is configured to create output AC power through alternating operation of the first switch and the second switch; and wherein the common AC return is connected to the AC power source such that the input AC power, the intermediate DC power and the output AC power are connected to the common AC return line so as to prevent common mode fluctuations and harmonics.

2. The power conversion system of claim 1 wherein the AC power source is a generator on an aircraft.

3. The power conversion system of claim 1 wherein the AC input power is 360-800 Hz 115 VAC and the output AC power is 50/60 Hz 115 VAC.

4. The power conversion system of claim 1 wherein the PFC stage draws current directly proportional to a waveform of an applied voltage of the AC input power.

* * * * *